United States Patent [19]
Lipoma

[11] 3,793,937
[45] Feb. 26, 1974

[54] LIQUID TREATMENT AND EXTRACTION APPARATUS

[76] Inventor: Samuel P. Lipoma, P.O. Box 1064, Delano, Calif. 93215

[22] Filed: Oct. 13, 1971

[21] Appl. No.: 188,857

[52] U.S. Cl............ 99/355, 62/64, 62/374, 99/404, 99/517, 214/17 B
[51] Int. Cl............... A23n 15/00, F25d 17/02
[58] Field of Search.. 99/198, 100 P, 193, 517, 355, 99/404; 62/63, 64, 374, 375; 214/17 B

[56] References Cited
UNITED STATES PATENTS

| | | | |
|---|---|---|---|
| 1,062,379 | 5/1913 | Anderson | 214/17 B |
| 1,898,758 | 2/1933 | Bottoms | 62/64 |
| 3,603,243 | 9/1971 | Foster | 99/404 |
| 2,015,167 | 9/1935 | Varney | 62/63 |
| 3,592,666 | 7/1971 | Butler | 99/193 |
| 3,597,239 | 8/1971 | Vahlsing | 99/100 P |
| 3,397,993 | 8/1968 | Strong | 99/193 |
| 3,669,685 | 6/1972 | Weaver et al. | 99/193 |
| 2,787,141 | 4/1957 | Julius | 62/63 |

*Primary Examiner*—Norman Yudkoff
*Assistant Examiner*—Curtis F. Ribando

[57] ABSTRACT

Apparatus and method for treating food and other products with volatile fluorocarbons employing liquid seals to prevent loss of fluorocarbon vapor.

7 Claims, 4 Drawing Figures

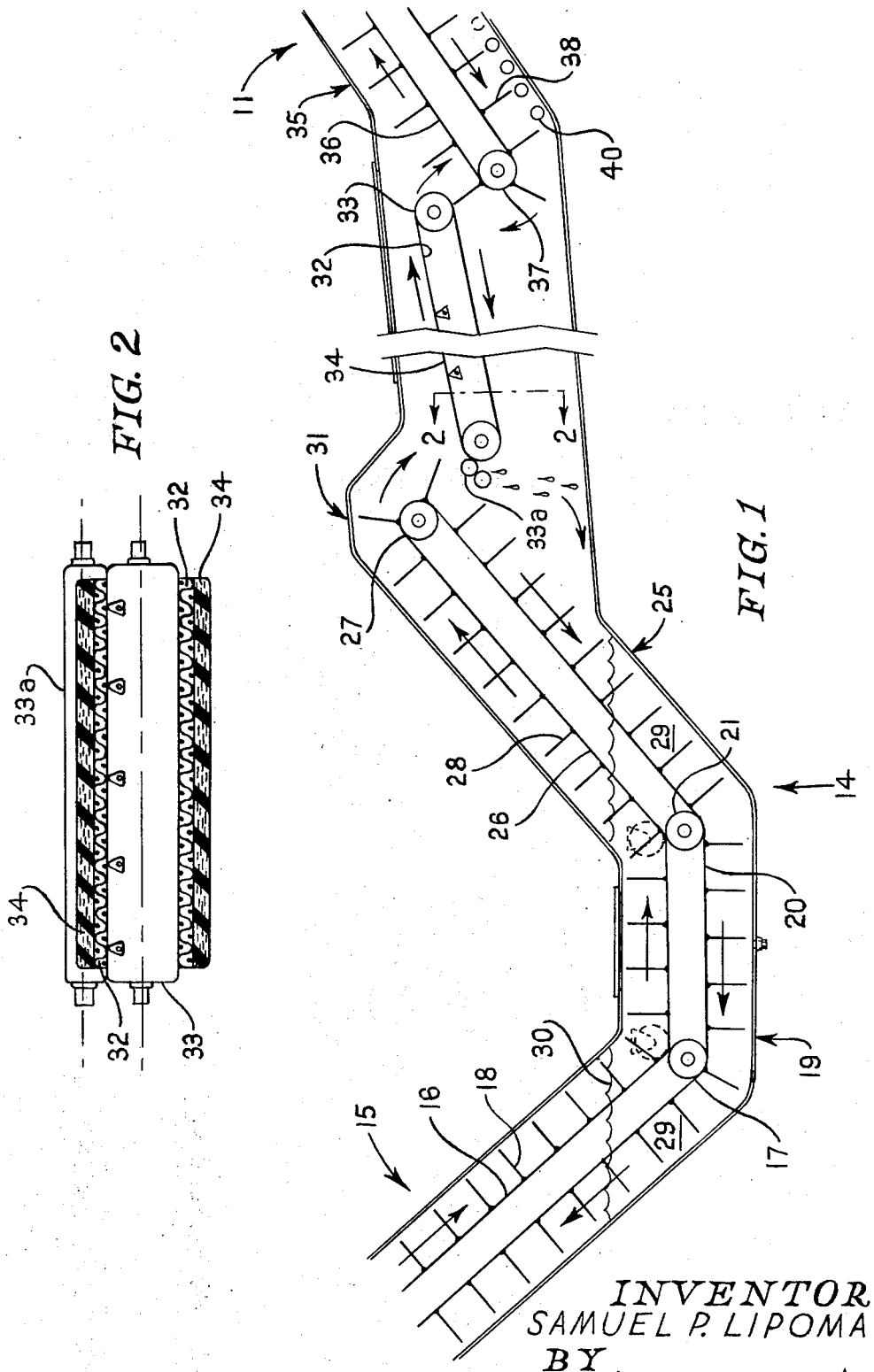

INVENTOR
SAMUEL P. LIPOMA
BY
Gregg, Hendricson and Caplan
ATTORNEYS

LIQUID TREATMENT AND EXTRACTION APPARATUS

This invention relates to the treatment of various products with volatile fluorocarbons, particularly those fluorocarbons which boil substantially below the freezing point of water.

The invention will be described first with reference to a surface freezing treatment and subsequent leaching of french-fried potatoes. It will be understood, however, that the apparatus and process of the present invention have application to other products some of which will be described.

In the processing of potatoes for what is known as "french-fried potatoes" certain difficulties are encountered. In the normal processing of potatoes to produce french-fried potatoes, the potatoes are washed and peeled and cut into pieces such as strips or slices, which are then fried in edible oil whereby to cook the potato tissue and develop a desirable crispness and color. The products are finally salted and are ready for use or sale. Conventional antioxidants may be also applied where the products are not to be consumed soon after preparation.

If potatoes are to be stored a considerable length of time under refrigeration or in the frozen state before use, the frying step noted above will be what is known as "parfrying", which is a light frying sufficient to fry the surfaces of the potatoe, but not enough to cook the interior to the point that it is ready for consumption. Such parfried potatoes are held in storage under refrigeration (e.g., 35° to 40° F) or are frozen (the entire potato being frozen) and at the time of use the potatoes are thawed (if frozen) and are cooked, for example fried in edible oil or baked for consumption.

Although the production of french-fried potatoes is a relatively simple procedure, one very important problem repeatedly confronts the manufacturer, namely, the formation of products of acceptable and uniform color. This problem is brought about by variation in the chemical composition of the raw potatoes and is explained as follows:

If the potatoes are freshly harvested or have been stored after harvest at a temperature of about 50° F (10° C) or above, no complications will generally occur. Under such circumstances, the raw pieces can be readily fried to yield a product of acceptable color. However, when the potatoes have been kept at the lower temperature (that is, cold storage temperatures of about 40° F (5° C) necessary for holding the tubers longer than about three months, complications set in. Potatoes held under such cold storage conditions tend to darken on frying to give products of very undesirable dark brown color, that is, products which are not marketable.

The reason why such potatoes tend to darken excessively can be explained as follows: When the potatoes are kept in cold storage, part of the starch in the tubers is converted into glucose or other reducing sugars. Thus it has been shown, for example, that the browning tendency of the tubers increases as the content of reducing sugars increases. It has also been postulated that the reducing sugars react with the nitrogeneous constituents in the potatoes whereby to produce dark-colored reaction products. During the frying operation this browning reaction proceeds very rapidly at the high temperatures to which the potatoes are subjected. It is to be emphasized, however, that regardless of the theory involved, it is well established that potatoes which have been kept in cold storage brown excessively on drying as discussed above.

A procedure has been developed to eliminate or ameliorate this problem. That procedure is described in a paper by Weaver and Hautala, American Potato Journal, Vol. 48, pages 199–205 (1971) entitled "Leaching of French Fried Potato Strips". That procedure involves surface freezing of the potato. This is accomplished as follows: The pieces of raw potato, after washing, peeling and cutting into pieces are contacted with a liquid refrigerant which is at a temperature sufficiently low to quickly freeze the surface layers of the pieces of raw potato. Suitable for this purpose is liquid nitrogen which inherently exists at a temperature of about $-320°F$. Most advantageously, however, fluorocarbons are employed which are low boiling and preferably those which boil substantially below the freezing point of water. Typical fluorocarbons which may be used in accordance with the invention are the following:

| Solvent | Formula | Boiling point °F. | °C. |
|---|---|---|---|
| Tetrafluoromethane | $CF_4$ | −198.4 | −128.0 |
| Trifluoromethane | $CHF_3$ | −115.7 | −82.1 |
| Trifluoromonochloromethane | $CClF_3$ | −114.6 | −81.4 |
| Hexafluoroethane | $CF_3-CF_3$ | −108.8 | −78.2 |
| Trifluoromonobromomethane | $CBrF_3$ | −72.0 | −57.8 |
| Difluoromonochloromethane | $CHClF_2$ | −41.4 | −40.8 |
| Pentafluoromonochloroethane | $CClF_2-CF_3$ | −37.7 | −38.7 |
| Difluorodichloromethane | $CCl_2F_2$ | −21.6 | −29.8 |
| 1,1-difluoroethane | $CH_3-CHF_2$ | −11.2 | −24.0 |
| Symmetrical tetrafluorodichloroethane | $CClF_2-CClF_2$ | 38.4 | 3.6 |
| Monofluorodichloromethane | $CHCl_2F$ | 48.1 | 8.9 |
| Monofluorotrichloromethane | $CCl_3F$ | 74.8 | 23.8 |
| Octafluorocyclobutane | 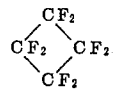 | 21.1 | −6.0 |

Those fluorocarbons which boil substantially below the freezing point of water are preferred. Liquid nitrogen may also be used but low boiling fluorocarbons are preferred. Particularly preferred in this procedure is the use of difluorodichloromethane (hereinafter referred to as DFDCM) because this material, among other things, can be used at about its boiling point ($-21.6°$ F) which is a conveniently maintained temperature. Also, this material is acceptable for contact with food products. Contact of this or other fluorocarbon refrigerant with the food product, for example potato pieces, is effected by dipping or submerging the potato pieces in the liquid fluorocarbon.

Following the surface freezing treatment the potato product is brought into contact with warm water. This has the effect of leaching sugar from the potato product so that it will not become discolored when it is finish fried.

In the practice of the surface freezing process certain difficulties are encountered. One of the most important of these difficulties is that of recovering the vapor of fluorocarbon and recondensing it for re-use, which is necessary to make the process economical. Heretofore, it has been proposed to employ restricted entry and exit openings for introducing potato pieces into the apparatus and for removing them from the apparatus, but such means allows the loss of a considerable amount of vapor which necessitates either a loss in the operation of the system or the use of expensive vapor recovery equipment outside the apparatus.

It is an object of the present invention to provide an improved apparatus and an improved method for carrying out the surface treatment, extraction, etc. of various products, more particularly food products, with liquid, low-boiling fluorocarbons.

It is a further and particular object of the invention to provide improved apparatus and method of surface freezing potato pieces which apparatus and method reduce to a very small degree the amount of vapor which escapes from the system and either represents a loss or a costly recovery procedure and apparatus.

In accordance with the present invention the product to be treated, e.g., potato pieces such as those intended to become french-fried potatoes, are subjected to contact, preferably by submergence, in a body of volatile liquid fluorocarbon or liquid nitrogen and the entry portion and exit portions of the apparatus embody liquid seals. By this means the escape of fluorocarbon vapor is possible only through the liquid seals, and it is reduced to a minimum such that its recovery is not necessary. The liquid used for the seal may be any liquid boiling substantially higher than the fluorocarbon which is employed. Ordinarily that liquid will be water or fatty oil.

Certain embodiments of the invention are illustrated by way of example in the accompanying drawings which show diagrammatically certain apparatus, systems and methods for carrying out the processes of the invention.

IN THE DRAWINGS

FIG. 1 is a view in longitudinal vertical section of the entry portion of the apparatus embodying a liquid seal.

FIG. 2 is a view taken along the line 2—2 of FIG. 1 showing, on a larger scale than that of FIG. 1, the details of construction of a portion of the conveyor apparatus.

Figure 3:
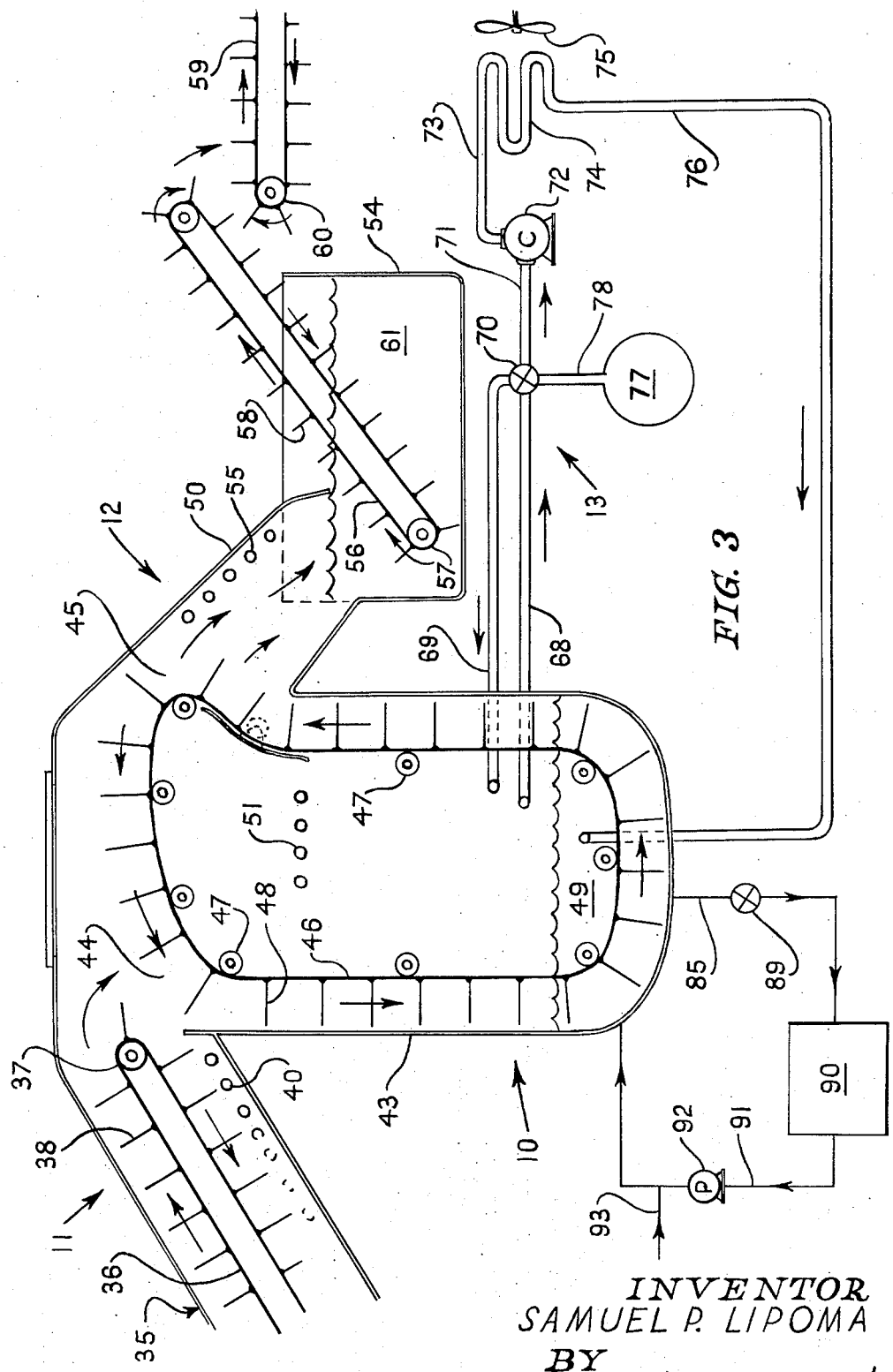
FIG. 3 is a continuation of FIG. 1 and shows the contact apparatus, the exit portion of the apparatus and the vapor pressure control portion of the apparatus.

Referring now to FIGS. 1 and 3 of the drawings, the apparatus comprises a product-contacting and surface-freezing portion 10, a product entry portion 11, a product exit portion 12 and a vapor control portion and system 13.

The product entry portion 11 comprises a conduit or tunnel 14 having a downwardly sloping incoming portion 15 within which an endless conveyor 16 is carried on rollers, one of which is shown at 17, such conveyor being provided with barrier members 18. The space between each successive pair of barriers 18 is filled with potato pieces suitable for french frying. The lowermost portion of the tunnel 14 comprises a horizontal section 19 within which a continuous conveyor belt 20 is located, which is supported on rollers 21. The horizontal portion 19 of the tunnel 14 leads to an upwardly slanting portion 25 within which is located a continuous conveyor belt 26 mounted on rollers such as shown at 27, and equipped with barrier members 28. A body of liquid such as water is maintained at 29 in the horizontal portion 19 of the tunnel 14 and thereabove to the level 30. A further segment of the tunnel 14 is shown at 31 which slopes slightly upwardly and within which there is an endless conveyor 32 mounted on rollers 33. This and other conveyors in the apparatus are preferably made of open mesh stainless steel. To the belt 32 is affixed a spongy layer 34, e.g., of sponge rubber. At its entry end the belt 32 and spongy layer 34 pass between squeeze rollers 33a. The section 31 of the tunnel 14 connects with an upwardly sloping section 35 within which is an endless conveyor 36 supported on rollers 37 and provided with barrier members 38. As shown the conveyor segments 16, 20 and 26 may be a single continuous conveyor with pressure rollers at the points of inflection.

In operation, this entry portion 14 of the apparatus functions as follows: Potato pieces prepared in the manner described are delivered by suitable means (not shown) and in measured amounts to each of the pockets formed by the belt 16 and barrier members 18. At the point 30 the potato pieces enter the body of liquid and remain in that body of liquid until they emerge in section 25. Preferably this body of liquid is water and it may be ordinary tap water and at room temperature. If it should be desired to cool the potato pieces, this water may be refrigerated somewhat, or if for some reason it is desired to warm the potato pieces, suitable heating coils or other heating means (not shown) may be provided for that purpose. The potatoes will then proceed upwardly along the conveyor 26 and will be dumped onto conveyor 32. The conveyor 26 is vibrated by suitable means (not shown) to shake off adhering water which falls back into the body of water 29. The temperature in this segment of the tunnel 14 is preferably maintained above the freezing point of water, such that no ice forms therein. The conveyor belt 32–34 will be vibrated by suitable means (not shown) so that all surfaces of the potato pieces will come into contact with the sponge belt and adhering moisture will be shaken off and will be absorbed by the sponge belt, so that the potato pieces as delivered to the segment 35 of the tunnel 14 will be as free as possible of water. Water absorbed by the sponge belt is squeezed out by the squeeze rollers 33a and will flow back into the body of water 29.

It is desirable to keep as much water as possible both in vapor or liquid form, out of the contact portion 10. To this end the segment 35 of the tunnel 14 is sloped upwardly so that water will fall back. Moreover, coils are shown at 40 which refrigerate the segment 35 to the point that water vapor is condensed and flow of water vapor into the contact portion 10 is minimized. The temperature in segment 35, however, is kept above the boiling point of the fluorocarbon in tank 43 (see below) so that none of it condenses in segment 35 and therefore none of it reaches the body of water 29. Preferably the temperature in segment 35 is low enough to freeze the water, and ice is removed from time to time by defrosting.

The contact portion 10 is shown as an insulated tank 43 which is closed except for a potato inlet 44 and a potato outlet 45, and except for vapor and liquid inlets and outlets described hereinafter. Within this tank there is a continuous conveyor belt 46 supported on rollers 47 and provided with barrier members 48. As will be seen, this conveyor describes a loop. Commencing at the potato inlet point 44, the conveyor proceeds vertically downwardly, at its lowest point it is submerged in liquid refrigerant such as DFDCM at 49, and it thence proceeds upwardly, thence around a bend adapted to dump the potato product into an outlet duct 50. Thence the conveyor proceeds upwardly, around and back to the potato entry point 44. Within the vapor space above the level of the liquid refrigerant are coils, one of which is shown at 51, such coils being distributed about the vapor space at suitable points and in suitable number and carrying a refrigerant such as liquid ammonia, which is capable of lowering the temperature of the vapor below its boiling point, thereby condensing it. A suitable temperature in the vapor space is $-22°$ to $-58°$ F if the refrigerant is DFDCM. The dwell time of the potato pieces in the pool of DFDCM is such that they are surface frozen in accordance with the process described above and as described in the American Potato Journal cited above.

Referring now to the exit portion 12 of the apparatus, a tank 54 is provided into which the outlet duct 50 extends. Refrigeration coils 55 are provided for the duct 50 to condense water vapor therein. As in the case of the segment 35, the temperature is above the boiling point of the fluorocarbon. Within the tank 54 is an endless conveyor 56 supported on rollers 57, such conveyor having barrier members or cleats 58 whereby the potato product is conveyed to the upper end of the conveyor 55 and dumped onto a conveyor 59 supported on rollers, one of which is shown at 60. The potato pieces are then subjected to leaching as described above, and in the paper cited in the American Potato Journal. A body of liquid, preferably water 61 is maintained in the tank 54. Preferably this water is maintained close to or at 32° F to minimize its vaporization. Water condensed in duct 50 drains back into the tank 54.

Referring now to the vapor pressure control system, a vapor outlet pipe is shown at 68 and a vapor inlet pipe at 69, both of which are open to the interior of the tank 43. The pipes 68 and 69 are connected to different ports of an automatic pressure-operated three-way valve 70 of known type and construction. If the vapor pressure within the tank 43 above the liquid level becomes excessive, the valve 70 is automatically turned to a position such as to connect the vapor outlet pipe 68 with a pipe 71 leading to a compressor 72 which compresses the vapor and passes it through an outlet 73 to a condensing coil 74. A fan shown at 75 indicates a cooling means which extracts heat from the compressed vapor and causes condensation of the vapor to the liquid state. The condensate passes through a pipe 76 and back into the tank 43 and the pool of liquid refrigerant. On the other hand, if the vapor pressure within the tank 43 becomes too low, the valve 70 is automatically adjusted to a position such that the vapor inlet pipe 69 is connected to a source 77 of vapor under pressure through a pipe 78. This system operates automatically to maintain the vapor pressure within the tank 43 at the desired level. Preferably, since the water seals and inlet and outlet tunnels and ducts are normally at atmospheric pressure, the valve 70 is set to maintain a vapor pressure within tank 43 which is approximately one atmosphere.

Inasmuch as the body of fluorocarbon 49 will become contaminated, for example by extraction of material from the potato pieces, from time to time or continuously some of the fluorocarbon is drawn off through a line 85 containing a valve 86 and is purified in an apparatus 90 which may be a filter and/or a solvent extraction unit and/or a distillation unit. The purified fluorocarbon is returned through a line 91 by a pump 92. Make-up fluorocarbon is introduced through a line 93. The amount of such make-up is, however, very small.

The surface freezing process carried out in tank 43 is an illustration of various processes to which the invention is applicable and potatoes illustrate only one among various products, food products and otherwise, to which the process of the invention is applicable.

For example, as described in my copending application Ser. No. 190,373 entitled "Method of Treating Solid Substances with Fluorocarbons", various products and articles, e.g., raw and cooked meats, eggs in the shell, etc. may be sterilized by contact with a solution of ethylene oxide in a liquid fluorocarbon such as DFDCM. This solution may take the place of the fluorocarbon 49 in the tank 43. The body of water 61 in that case should be sterile, e.g., it may be circulated through a heater (not shown) wherein it is heated to and held at a temperature sufficient to kill all microorganisms.

As described in my copending application Ser. No. 178,194 entitled "Process for Extracting Oil from Products" filed Sept. 7, 1971, a liquid fluorocarbon may also be used to extract fatty oil from a product which may be a food product such as potato chips or a non-food product such as wool.

Figure 4:
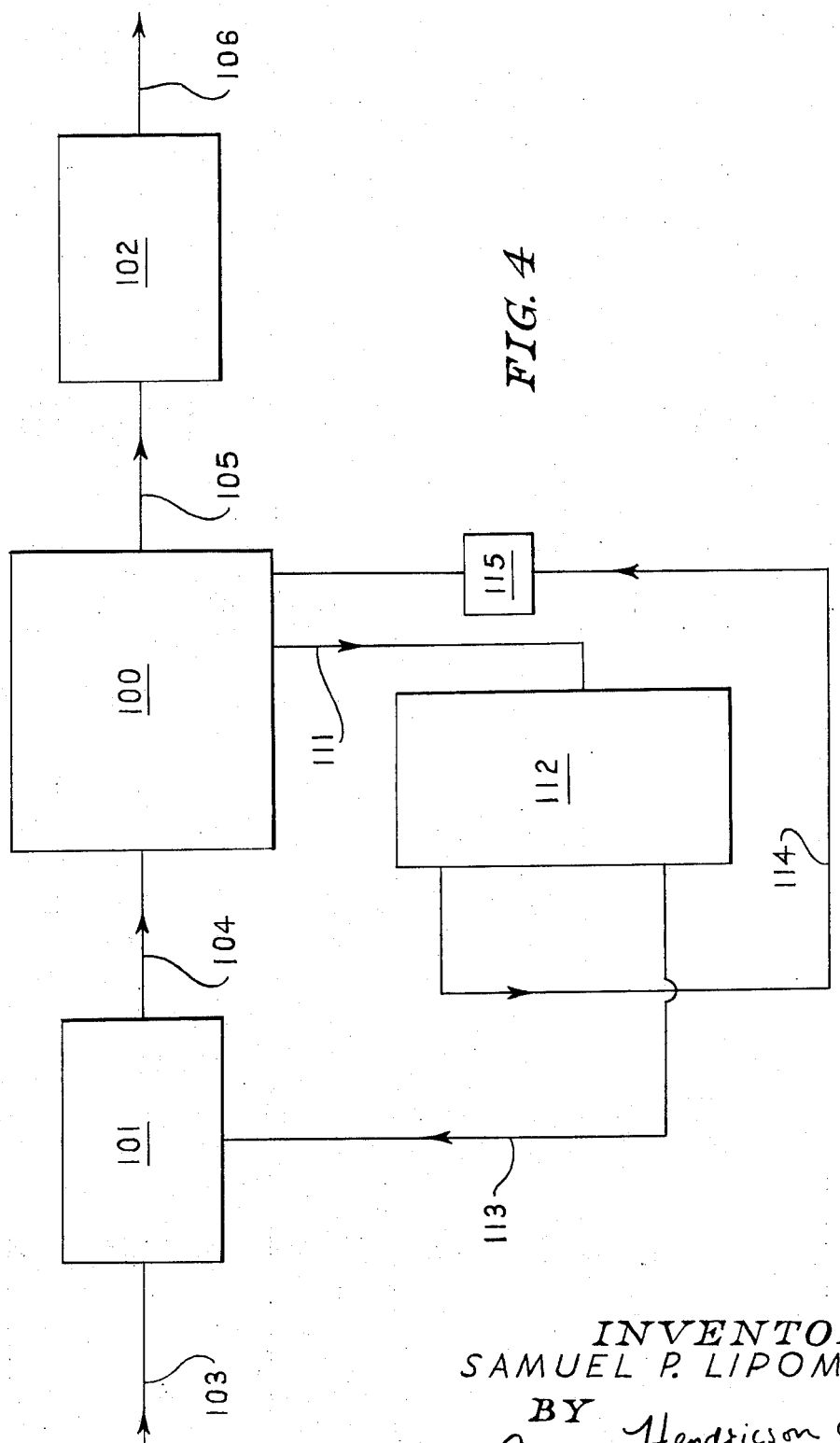
FIG. 4 is a diagrammatic showing of a modification of the apparatus of FIGS. 1 and 3 adapted for an oil cooking operation.

Referring now to FIG. 4 apparatus suitable for oil extraction is thereshown. An extraction unit 100 is shown which may be similar to the tank 43 of FIG. 3. Liquid seals are shown at 101 and 102 which may be constructed as shown in FIGS. 1 and 3. A product such as potato pieces is introduced through line 103, passed through the water seal 101 and thence through the line 104 to the extraction unit 100 wherein the pieces are subjected to extraction. The liquid seal 101 may contain a fatty oil which is heated to accomplish cooking of potato slices in the manner set forth in my copending application Ser. No. 178,194 referred to above. That is to say the potato slices will be cooked sufficiently to be edible and to a moisture content of about five percent. Then the cooked potato chips pass through the line 104 to the extraction unit 100 wherein they are brought into contact with and submerged in a body of DFDCM to extract oil from the chips and reduce their oil content by about 20 to 40 percent and at the same time remove moisture. The thus treated chips pass through the line 105 to liquid seal 102 which in this case is another body of fatty oil but preferably at room temperature or lower so as not to impregnate the chips with a further substantial quantity of oil. Also the residence time of the chips in the body of oil in the oil seal 102 will be such as to minimize take-up of oil. The completely processed chips are removed from the system at 106.

Inasmuch as the body of DFDCM in the extraction unit 100 extracts oil from the chips and dissolves it in the fluorocarbon liquid, it is necessary to purify the latter. It is withdrawn continuously or intermittently through a line 110 and passed into a distillation unit 112. Bottoms from this distillation unit, constituting the separated oil, are recycled through a line 113 to the oil seal and cooker 101. Overhead distillate, which constitutes the separated and purified fluorocarbon liquid is taken off of the top of the unit 112 and returned through a line 114 to the extraction unit 100. A condenser 115 condenses the fluorocarbon vapor.

In another oil extraction application of the apparatus and method of the present invention the product introduced through the liquid seal 101 (in this case a water seal) is raw wool which requires extraction of oil and grease. The wool then passes through the line 104 to the extraction apparatus 100 wherein it is submerged in a body of DFDCM. The thus treated and extracted wool passes through the line 105 to the second liquid seal (also a water seal) 102 anx thence outwardly through line 106 to be dried and further processed. In this case the purification of the used DFDCM will proceed as shown in FIG. 4. The purified and recovered fluorocarbon is recycled as indicated but there will, of course, be no recycling of the extracted oil. Instead the separated oils will be discarded or put to some other use.

From time to time, e.g., during normal periods of shut down as at night, the fluorocarbon may be drained and the various parts of the apparatus in which ice has accumulated may be defrosted by conventional means such as electric heating elements.

It will therefore be apparent that a new and very advantageous process and apparatus have been provided for treating a variety of materials with volatile fluorocarbons and the like.

I claim:

1. Apparatus adapted for contact of a solid substance with a volatile liquid fluorocarbon or the like said apparatus comprising,
   a. an enclosed contact vessel having an inlet and outlet in the upper portion thereof and adapted to hold a body of liquid fluorocarbon with a vapor space thereabove;
   b. entry means for continuously introducing the solid substance which it is desired to treat into the inlet of said contact vessel, said entry means including a liquid seal through which the solid substance passes to the inlet of said vessel, the liquid present in said seal being maintained out of contact with said body of liquid fluorocarbon;
   c. means for continuously conveying said solid substance from the inlet of said vessel through said body of liquid fluorocarbon in submerged relation thereto and thence upwardly and through said outlet;
   d. exit means for continually transporting the solid substance after such treatment away from the outlet of said vessel to a delivery point, said exit means including a liquid seal through which said solid substance passes between said outlet and the delivery point, the liquid present in said seal being maintained out of contact with said body of liquid fluorocarbon.

2. The apparatus of claim 1 wherein said contact vessel is equipped with cooling means in the vapor space thereof to condense vapor of fluorocarbon and return it to the body of liquid fluorocarbon at the bottom of the vessel.

3. The apparatus of claim 2 wherein the entry and exit means each includes a sloping portion connected to the respective inlet and outlet of the contact vessel, the slope of each such section being downwardly from the respective inlet and outlet whereby condensed vapor escaping from the respective liquid seals flows back into the respective seal, and each such portion is also provided with cooling means to condense such vapor.

4. The apparatus of claim 3 wherein the liquid of each seal is water.

5. The apparatus of claim 3 wherein the liquid of each seal is a fatty oil.

6. The apparatus of claim 5 wherein the oil seal associated with the entry means is provided with heating means to effect cooking of a food product constituting the solid substance to be treated and the contact vessel is adapted to extract oil from such solid substance, and said contact vessel is equipped with means for removing liquid fluorocarbon, purifying the same by separation of the dissolved oil from the fluorocarbon liquid, and recycling of the fluorocarbon liquid.

7. The apparatus of claim 6 wherein the apparatus is also provided with means for recycling separated oil to the oil seal associated with the entry means.

* * * * *